(12) United States Patent
Borlick et al.

(10) Patent No.: US 11,119,851 B2
(45) Date of Patent: Sep. 14, 2021

(54) DETERMINING WHEN TO PERFORM ERROR CHECKING OF A STORAGE UNIT BY TRAINING A MACHINE LEARNING MODULE

(71) Applicant: INTERNATIONAL BUSINESS MACHINES CORPORATION, Armonk, NY (US)

(72) Inventors: Matthew G. Borlick, Tucson, AZ (US); Karl A. Nielsen, Tucson, AZ (US); Clint A. Hardy, Tucson, AZ (US); Lokesh M. Gupta, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 5 days.

(21) Appl. No.: 16/103,545

(22) Filed: Aug. 14, 2018

(65) Prior Publication Data

US 2020/0004625 A1    Jan. 2, 2020

Related U.S. Application Data

(63) Continuation of application No. 16/023,443, filed on Jun. 29, 2018.

(51) Int. Cl.
*G06F 11/07* (2006.01)
*G06F 11/10* (2006.01)
*G06N 20/00* (2019.01)

(52) U.S. Cl.
CPC ........ *G06F 11/106* (2013.01); *G06F 11/1096* (2013.01); *G06N 20/00* (2019.01); *G06F 11/0751* (2013.01); *G06F 11/0754* (2013.01); *G06F 11/0763* (2013.01)

(58) Field of Classification Search
CPC ... G06F 11/106; G06F 11/1096; G06N 20/00; G11B 20/10009
See application file for complete search history.

(56) References Cited

U.S. PATENT DOCUMENTS 6,745,303 B2   6/2004  Watanabe
6,981,070 B1 * 12/2005  Luk ...................... G06F 3/0617
                                                      710/5

(Continued)

FOREIGN PATENT DOCUMENTS

CN    108108810 A    6/2018

OTHER PUBLICATIONS

Wikipedia's Disk Array Controller historical version published Mar. 8, 2018 https://en.wikipedia.org/w/index.php?title=Disk_array_controller&oldid=829416498 (Year: 2018).*

(Continued)

*Primary Examiner* — Joseph O Schell
(74) *Attorney, Agent, or Firm* — David W. Victor; Konrad Raynes Davda & Victor LLP

(57) ABSTRACT

Provided are a computer program product, system, and method for using a machine learning module to determine when to perform error checking of a storage unit. Input on attributes of at least one storage device comprising the storage unit are provided to a machine learning module to produce an output value. An error check frequency is determined from the output value. A determination is made as to whether the error check frequency indicates to perform an error checking operation with respect to the storage unit. The error checking operation is performed in response to determining that the error checking frequency indicates to perform the error checking operation.

21 Claims, 9 Drawing Sheets

(56) References Cited

U.S. PATENT DOCUMENTS

| | | | |
|---|---|---|---|
| 6,986,075 B2 | 1/2006 | Ackaret et al. | |
| 7,236,911 B1* | 6/2007 | Gough | G06F 11/008 |
| | | | 702/185 |
| 7,890,815 B2 | 2/2011 | Hafner et al. | |
| 8,327,250 B1 | 12/2012 | Goel | |
| 8,351,289 B1 | 1/2013 | Brand et al. | |
| 8,468,244 B2 | 6/2013 | Redlich et al. | |
| 9,558,068 B1 | 1/2017 | Bono et al. | |
| 9,621,421 B1 | 4/2017 | Tolentino et al. | |
| 9,678,817 B1 | 6/2017 | Hasbun Pacheco et al. | |
| 10,067,840 B1 | 9/2018 | Labaj et al. | |
| 10,216,422 B2* | 2/2019 | Kim | G06F 3/0656 |
| 10,419,530 B2 | 9/2019 | Shirazipour | |
| 10,572,323 B1 | 2/2020 | Zhai et al. | |
| 10,613,962 B1* | 4/2020 | Delange | G06F 11/3006 |
| 10,838,833 B1 | 11/2020 | Jibaja et al. | |
| 2004/0017629 A1 | 1/2004 | Lamberts et al. | |
| 2006/0149900 A1 | 7/2006 | Terry et al. | |
| 2006/0285409 A1 | 12/2006 | Hummler | |
| 2007/0022244 A1 | 1/2007 | Kimmery | |
| 2007/0179993 A1 | 8/2007 | Arruza | |
| 2009/0055357 A1 | 2/2009 | Richardson et al. | |
| 2009/0216910 A1 | 8/2009 | Duchesneau | |
| 2010/0046118 A1 | 2/2010 | Lee et al. | |
| 2010/0122146 A1 | 5/2010 | Nazarian et al. | |
| 2010/0217752 A1 | 8/2010 | Deenadhayalan et al. | |
| 2013/0128666 A1* | 5/2013 | Avila | G11C 16/3418 |
| | | | 365/185.11 |
| 2014/0108855 A1* | 4/2014 | Gopakumar | G06F 11/008 |
| | | | 714/6.2 |
| 2014/0189440 A1 | 7/2014 | Ba | |
| 2015/0074450 A1 | 3/2015 | Blount et al. | |
| 2015/0199243 A1 | 7/2015 | Wu et al. | |
| 2015/0310349 A1* | 10/2015 | Li | G06Q 50/06 |
| | | | 706/52 |
| 2016/0041870 A1* | 2/2016 | Davis | G06F 11/1048 |
| | | | 714/773 |
| 2016/0042024 A1 | 2/2016 | Campanotti et al. | |
| 2016/0092140 A1 | 3/2016 | Santaniello et al. | |
| 2016/0188424 A1 | 6/2016 | Walls | |
| 2017/0039140 A1* | 2/2017 | Zhu | G06F 3/0664 |
| 2017/0132525 A1 | 5/2017 | Rozier | |
| 2017/0147436 A1* | 5/2017 | Borlick | G11C 29/38 |
| 2017/0207981 A1* | 7/2017 | Maguire | H04W 24/04 |
| 2018/0018582 A1* | 1/2018 | Unsal | A61P 35/00 |
| 2018/0032398 A1 | 2/2018 | Hasegawa | |
| 2018/0081571 A1* | 3/2018 | Akshara | G06F 3/0653 |
| 2018/0143762 A1 | 5/2018 | Kim et al. | |
| 2018/0174658 A1* | 6/2018 | Kikuchi | G11C 29/028 |
| 2018/0181087 A1 | 6/2018 | Komatsu et al. | |
| 2018/0267858 A1* | 9/2018 | Bacha | G06F 11/0766 |
| 2018/0330258 A1 | 11/2018 | Harris et al. | |
| 2018/0357535 A1* | 12/2018 | Shulkin | G11C 11/5642 |
| 2019/0050318 A1 | 2/2019 | Beltman et al. | |
| 2019/0095299 A1 | 3/2019 | Liu et al. | |
| 2019/0122096 A1 | 4/2019 | Husain | |
| 2019/0235484 A1 | 8/2019 | Ristovski et al. | |
| 2019/0278498 A1 | 9/2019 | Dedrick | |
| 2019/0306121 A1 | 10/2019 | Anderson et al. | |
| 2020/0004434 A1 | 1/2020 | Borlick et al. | |
| 2020/0004435 A1 | 1/2020 | Borlick et al. | |
| 2020/0004437 A1 | 1/2020 | Borlick et al. | |
| 2020/0004439 A1 | 1/2020 | Borlick et al. | |
| 2020/0004623 A1 | 1/2020 | Borlick et al. | |
| 2020/0051347 A1* | 2/2020 | Bohl | G06N 20/00 |
| 2020/0097921 A1* | 3/2020 | Ghosh | G06Q 10/067 |

OTHER PUBLICATIONS

Anonymously, "Method for Self-Scrubbing ECC for Set-Associative Cache"; dated Feb. 13, 2007, An IP.com Prior Art Database Technical Disclosure, (online), retrieved from the Internet at URL>http://ip.com/IPCOM/000146495D, Total 4 pages.

Ryu, J. et al.; "Effects of Scrubbing on Reliability in Storage Systems"; Pohang University of Science and Technology; 2009.

"Special instructions to remove latent Parity Inconsistency (PI) errors and upgrade a disk drive to a new firmware version", Reference #: S1003638, dated Mar. 4, 2011, (online) retrieved from the Internet at URL> http://www-01.ibm.com/support/docview.wss?uid=ssg1S1003638 on May 17, 2018, Total 4 pages.

"How RAID-level disk scrubs verify data integrity", dated May 2013, (online) retrieved from the Internet at URL> https://library.netapp.com/ecmdocs/ECMP1196912/html/GUID-81F8BE on May 17, 2018.

Anonymously; "System and Method to do Data Scrubbing of RAID by Leveraging Array Workload Regularity"; dated Dec. 19, 2014., An IP.com Prior Art Database Technical Disclosure, (online) retrieved from the Internet at URL>http://ip.com/IPCOM/000239983D, Total 5 pages.

Anonymously, "System and Method of Array Scrub Adaptive Adjustment" dated Dec. 22, 2015, An IP.com Prior Art Database Technical Disclosure, (online) retrieved from the Internet at URL> http://ip.com/IPCOM/000244567D, Total 9 pages.

Barhate, D. et al., "Method for Logging Writes on Erasure Coded Storage System to Optimize the Network Usage Across Nodes for Data Updates"; dated Mar. 8, 2017, An IP.com Prior Art Database Technical Disclosure, (online), retrieved from the Internet at URL>http://ip.com/IPCOM/000249629D, Total 5 pages.

"Storage aggregate scrub", NetApp ONTAP9 Documentation Center, (online) retrieved from the Internet at URL> https://docs.netapp.com/ontap-9/index.jsp?topic=%2Fcom.netapp.doc.dot-cm-cmpr-920%2Fstorage_aggregate_scrub.html on May 17, 2018.

"S.M.A.R.T.", Wikipedia, (online), retrieved Jun. 20, 2018 from the Internet at URL>https://en.wikipedia.org/wiki/S.M.A.R.T., Total 20 pages.

U.S. Appl. No. 16/023,443, filed Jun. 29, 2018.

List of IBM Patents or Patent Applications Treated as Related, dated Oct. 2, 2018, pp. 2.

Preliminary Amendment dated Sep. 27, 2018, pp. 14, for U.S. Appl. No. 16/145,161.

U.S. Appl. No. 16/023,456, filed Jun. 29, 2018.

U.S. Appl. No. 16/115,540, filed Aug. 28, 2018.

Preliminary Amendment dated Aug. 28, 2018, pp. 12, for U.S. Appl. No. 16/115,540.

U.S. Appl. No. 16/023,502, filed Jun. 29, 2018.

U.S. Appl. No. 16/145,161, filed Sep. 27, 2018.

Preliminary Amendment dated Oct. 4, 2018, pp. 13, for U.S. Appl. No. 16/023,456.

Preliminary Amendment dated Oct. 4, 2018, pp. 9, for U.S. Appl. No. 16/023,502.

Office Action dated Sep. 6, 2019, pp. 16, for U.S. Appl. No. 16/023,456, filed Jun. 29, 2018.

Office Action dated Sep. 18, 2019, pp. 13, for U.S. Appl. No. 16/115,540.

Response dated Dec. 6, 2019, pp. 13, to Office Action dated Sep. 6, 2019, pp. 16, for U.S. Appl. No. 16/023,456, filed Jun. 29, 2018.

Notice of Allowance dated Dec. 30, 2019, pp. 16, for U.S. Appl. No. 16/023,456, filed Jun. 29, 2018.

Response dated Dec. 18, 2019, pp. 11, to Office Action dated Sep. 18, 2019, pp. 13, for U.S. Appl. No. 16/115,540.

Office Action dated Mar. 4, 2020, pp. 39, for U.S. Appl. No. 16/023,443.

Office Action dated Mar. 25, 2020, pp. 28, for U.S. Appl. No. 16/115,540.

Response dated Jan. 30, 2020, pp. 14, to Office Action dated Oct. 30, 2019, pp. 35, for U.S. Appl. No. 16/023,502.

Final Office Action dated Feb. 27, 2020, pp. 34, for U.S. Appl. No. 16/023,502.

PCT International Search Report and Written Opinion dated Oct. 12, 2019, pp. 9, for International Application No. PCT/IB2019/055213.

English machine translation of CN108108810A dated Jun. 1, 2018, pp. 32.

U.S. Pat. No. 10,216,422 is the English language counterpart of CN108108810A.

Office Action dated Oct. 30, 2019, pp. 35, for U.S. Appl. No. 16/023,502.

Response dated Aug. 13, 2020, pp. 15, to Office Action dated May 12, 2020, pp. 32, for U.S. Appl. No. 16/023,502.
Interview Summary dated Aug. 13, 2020, pp. 7, for U.S. Appl. No. 16/023,443.
Response dated Aug. 18, 2020, pp. 15, for Final Office Action dated Jun. 18, 2020, pp. 27, for U.S. Appl. No. 16/023,443.
Final Office Action dated Jun. 18, 2020, pp. 27, for U.S. Appl. No. 16/023,443.
Response dated Jun. 1, 2020, pp. 14, for Office Action dated Mar. 4, 2020, pp. 39, for U.S. Appl. No. 16/023,443.
Office Action dated Aug. 7, 2020, pp. 10, for U.S. Appl. No. 16/023,456.
Amendment filed Apr. 27, 2020, pp. 14, to Final Office Action dated Feb. 27, 2020, pp. 34, for U.S. Appl. No. 16/023,502.
Office Action dated May 12, 2020, pp. 32, for U.S. Appl. No. 16/023,502.
Notice of Allowance dated Mar. 31, 2020, pp. 21, for U.S. Appl. No. 16/023,456.
Final Office Action dated Oct. 21, 2020, pp. 60, for U.S. Appl. No. 16/023,502.
Notice of Allowance dated Aug. 28, 2020, pp. 10, for U.S. Appl. No. 16/023,443.
Notice of Allowance dated Oct. 1, 2020, pp. 41, for U.S. Appl. No. 16/115,540.
Response dated Sep. 25, 2020, pp. 18, to Office Action dated Jun. 25, 2020, pp. 78, for U.S. Appl. No. 16/145,161.
Response dated Jun. 20, 2020, pp. 10, to Office Action dated Mar. 25, 2020, pp. 28, for U.S. Appl. No. 16/115,540.
Office Action dated Jun. 25, 2020, pp. 78, for U.S. Appl. No. 16/145,161.
GB Examination Report dated Feb. 15, 2021, p. 5, for Application No. GB2100441.1.
Notice of Allowance dated Feb. 10, 2021, p. 44, for U.S. Appl. No. 16/023,456.
Response dated Feb. 16, 2021, p. 17, to Final Office Action dated Dec. 16, 2020, p. 63, for U.S. Appl. No. 16/145,161.
Office Action dated Jan. 29, 2021, p. 18, for U.S. Appl. No. 16/115,540.
Notice of Allowance dated Mar. 26, 2021, p. 19, for U.S. Appl. No. 16/145,161.
U.S. Appl. No. 17/152,782 dated Jan. 19, 2021.
Preliminary Amendment dated Jan. 19, 2021, p. 12, for U.S. Appl. No. 17/152,782.
List of IBM Patents or Patent Applications Treated as Related, dated Mar. 30, 2021, p. 2.
Notice of Allowances dated Jan. 12, 2021, p. 9, for U.S. Appl. No. 16/023,443.
Notice of Allowance dated Nov. 30, 2020, p. 20, for U.S. Appl. No. 16/115,540.
Response dated Dec. 3, 2020, p. 9, to Final Office Action dated Oct. 21, 2020, p. 60, for U.S. Appl. No. 16/023,502.
Notice of Allowance dated Jan. 12, 2021, p. 20, for U.S. Appl. No. 16/023,502.
Final Office Action dated Dec. 16, 2020, p. 63, for U.S. Appl. No. 16/145,161.
Response dated Nov. 3, 2020, p. 15, to Final Office Action dated Aug. 7, 2020, p. 10, for U.S. Appl. No. 16/023,456.

* cited by examiner

Storage Device Information

Error Checking Information

DETERMINING WHEN TO PERFORM ERROR CHECKING OF A STORAGE UNIT BY TRAINING A MACHINE LEARNING MODULE

BACKGROUND OF THE INVENTION

1. Field of the Invention

The present invention relates to a computer program product, system, and method for using a machine learning module to determine when to perform error checking of a storage unit.

2. Description of the Related Art

To maintain data integrity in a storage system, error checking and error correction operations if errors are detected may be performed on the data. For storage arrays, such as a Redundant Array of Independent Disks (RAID), parity data may be maintained that may be used to check whether there are data errors and to correct the data. In RAID arrays, a parity scrub operation may be periodically performed to verify integrity of data and parity blocks by reading all the blocks in a RAID stripe stored across the storage devices in a RAID array, and comparing the read data to the parity data to determine if there are inconsistencies. Parity scrub operations are computationally expensive requiring system computational resources and continual access to read data and parity data from the storage array. As drive capacities have increased, the extent of the error checking operations for a parity scrub has experienced a corresponding increase, which may result in latency delays for other operations and applications seeking to access the data in the RAID array.

One technique for error checking is to periodically perform a parity scrub after a fixed number of write operations. For critical data, system administrators may set the fixed number low to ensure continual error correction operations to avoid data errors propagating through the critical data. However, these continual error checking operations may cause latency delays in accessing the critical data.

There is a need in the art for improved techniques for determining when to perform error correction checking and operations in a storage unit.

SUMMARY

A First Embodiment comprises a computer program product, system, and method for using a machine learning module to determine when to perform error checking of a storage unit. Input on attributes of at least one storage device comprising the storage unit are provided to a machine learning module to produce an output value. An error check frequency is determined from the output value. A determination is made as to whether the error check frequency indicates to perform an error checking operation with respect to the storage unit. The error checking operation is performed in response to determining that the error checking frequency indicates to perform the error checking operation.

The First Embodiment provides improvements to computer technology for determining when to perform error checking and handling by using a machine learning module and algorithm to dynamically determine the likelihood of an error at a storage unit based on current operating parameters recorded for a storage device. In this way, the described embodiments optimize the allocation of computational and storage resources to error checking operations by dynamically determining a frequency at which to perform error checking operations that are based on a prediction as to whether a data error is likely given current operating conditions at a storage device. This dynamic determination bases a decision to perform error checking on a prediction as to whether a data error is likely given current operating conditions at a storage device.

In a second embodiment, the subject matter of the First and Third through Ninth Embodiments may optionally include that the storage unit comprises one of an array of storage devices or one storage device.

The Second Embodiment extends the optimization technique to optimize error checking operations for storage arrays of storage devices, such as RAID arrays, and for single storage device storage units.

In a Third Embodiment, the subject matter of the First, Second and Fourth through Ninth Embodiments may optionally include that the providing the input on attributes of the storage unit comprises periodically providing the input to the machine learning module to periodically produce the output value, wherein the operations of determining the error check frequency and the determining whether the error check frequency indicates to perform the error checking operation.

With the Third Embodiment, the determination of when to perform error checking using the machine learning algorithm to limit error checking to those instances where there is a prediction of a likelihood of error is periodically performed to continually determine whether error checking is needed to optimize the error checking. This ensures that any periods of increased error occurrences will be subject to error checking and handling, and that periods with low error rates will not result in error checking because the checking will not be performed when the likelihood of an error is low.

In a Fourth Embodiment, the subject matter of the First through Third and Fifth through Ninth Embodiments may optionally include that the determining the error check frequency from the output value comprises determining a number of writes as a function of the output value. The determining whether the error check frequency indicates to perform the error checking operation comprises determining whether a write counter exceeds the error check frequency. The error checking operation is performed in response to the write counter exceeding the error check frequency.

With the Fourth Embodiment, error checking operations are optimized by checking for errors when the write counter exceeds the error checking frequency, which is adjusted based on a determination of a likelihood of an error occurring with respect to the storage device. Thus, in this case error checking is again performed based on determined likelihood of an error to ensure optimized allocation of computing resources between error checking and other processes.

In a Fifth Embodiment, the subject matter of the First through Fourth and Sixth through Ninth Embodiments may optionally include resetting the write counter to zero in response to determining to perform the error checking operation.

With the Fifth Embodiment, the write counter is reset to allow a next determination to perform error checking to occur at the error checking frequency rate, which is trained based on current operating conditions.

In a Sixth Embodiment, the subject matter of the First through Fifth and Seventh through Ninth Embodiments may optionally include that the output value comprises a number from zero to 1 indicating a likelihood that there is an error in the storage unit. The determining whether the error check frequency indicates to perform the error checking operation comprises: not performing the error checking operation in response to the output value being less than a lower bound; performing the error checking operation in response to the output value being greater than an upper bound; and adjusting the error check frequency based on the output value in response to the output value being between the lower bound and the upper bound.

With the Sixth Embodiment, the error checking operation is not performed to optimize resource allocation to other operations when the output value indicates the likelihood of an error is below a low threshold and the error checking operation is performed if there is a greater likelihood of an error, which ensures the use of resources are redirected to error checking during a time of likely increased error rates. Further, the error checking frequency may be adjusted based on the output value to further optimize resource allocation for future error checking resources.

In a Seventh Embodiment, the subject matter of the First through Sixth, Eighth, and Ninth embodiments may optionally include that the error checking operation checks a fixed number of last writes, and wherein the adjusting the error check frequency sets the error check frequency to the fixed number of last writes divided by the output value.

With the Seventh Embodiment, only a limited number of writes are subject to error checking to further limit the use of computational resources as part of error checking.

In an Eighth Embodiment, the subject matter of the First through Seventh and Ninth Embodiments may optionally include that the attributes of the at least one storage used as the input to the machine learning module include at least one of: an error type if the error checking operation detected an error during a last run of the error checking operation or indication of no error if the error checking operation did not detect an error during the last run; a type of at least one storage device comprising the storage unit; an age of the at least one storage device from first use; a firmware level of the at least one storage device; a read operations per second at the at least one storage device; and a write operations per second at the at least one storage device.

With the Eighth Embodiment, attributes used to determine the likelihood of an error include those attributes most likely to be predictive of an error occurring to optimize the operation to determine when to perform error checking. For instance, the error type of a last error will have significantly predictive value if the error type is one that is likely or not likely to reoccur. An usage level or age may be predictive, such as older or more used storage devices may be more prone to errors. The firmware level may be predictive if a specific firmware level is associated with greater error rates. Also, the number of read and write operations that are occurring may also be highly predictive, as errors may more frequently occur during high usage rates.

In a Ninth Embodiment, the subject matter of the First through Eighth Embodiments may optionally include incrementing a write counter in response to performing a write operation against the storage unit; determining whether the write counter satisfies a condition with respect to the error checking frequency; performing the error checking operation and resetting the write counter in response to determining that the write counter satisfies the condition with respect to the error checking frequency.

With the Ninth Embodiment, the error checking operation is scheduled to occur when the number of writes indicated in the write counter satisfies a condition of the error frequency, such as equaling the error frequency. At this time, an error check should be performed to determine if there are errors to correct.

A Tenth Embodiment comprises a computer program product, method, and system for error checking data in a storage unit. A determination is made to train a machine learning module. In response to determining to train the machine learning module, a determination is made of inputs comprising attributes of at least one storage device of the storage unit. The machine learning module is trained to produce a desired output value indicating to perform an error checking operation of the storage unit from the determined inputs in response to detecting the error. The machine learning module is executed to produce an output value used to determine whether to perform an error checking operation with respect to the storage unit.

The Tenth Embodiment improves computer technology for error checking by retraining a machine learning module to produce a desired output value that reflects the current likelihood of an error based on current attributes of the storage device(s) to have the machine learning module more accurately predict a likelihood of an error at the storage unit, e.g., single storage device or array of storage devices. In this way, the Tenth Embodiment improves the accuracy in the machine learning module determining a likelihood of an error based on current operating conditions and attributes.

In an Eleventh Embodiment, the subject matter of the Tenth and Twelfth through Fifteenth Embodiments may optionally include detecting an error while performing the error checking operation, wherein the determining to train the machine learning module occurs in response to detecting the error. The desired output value is set to an output value indicating to perform error checking to use to train the machine learning module in response to detecting the error.

With the Eleventh Embodiment, the machine learning module predictability is improved by retraining the module to determine a likelihood of an error based on current operating conditions that are occurring when an error was in fact detected. In this way, the machine learning module is trained during real time error detection to indicate an error to improve the likelihood of predicting an error during actual error operating conditions.

In a Twelfth Embodiment, the subject matter of the Tenth, Eleventh, and Thirteenth through Fifteenth Embodiments may optionally include detecting that an error has not been detected within a fixed number of error checking operations. The determining to train the machine learning module occurs in response to detecting that the error has not been detected within the fixed number of error checking operations. The desired output value is set to an output value indicating to not perform error checking to use to train the machine learning module in response to detecting that an error has not been detected within the fixed number of error checking operations.

With the Twelfth Embodiment, the machine learning module predictability is improved by retraining the module to determine a likelihood of no error based on current operating conditions that are occurring when there has been no error detected during error checking. In this way, the machine learning module is trained during real time error detection to indicate a low likelihood of error to improve the likelihood of predicting an error during actual operating conditions when no error was detected.

In a Thirteenth Embodiment, the subject matter of the Tenth through Twelfth and Fourteenth through Fifteenth Embodiments may optionally that the training the machine learning module comprises determining a margin of error of the output value of the machine learning module and the desired output value. The margin of error and the inputs to train weights and biases of nodes in the machine learning module to produce the desired output value.

In a Fourteenth Embodiment, the subject matter of the Tenth through Thirteenth and Fifteenth Embodiments may optionally include that the machine learning module produces output values from inputs from storage arrays of storage devices managed by storage controllers to provide the storage controllers with output values based on the inputs from the storage devices indicating whether the storage controllers should perform error checking operations with respect to the storage devices in the storage arrays managed by the storage controllers.

With the Fourteenth Embodiment, network error prediction is improved by consolidating the prediction with one machine learning module that may be retrained based on errors occurring at all storage controllers. Thus retraining based on error detection at any storage controller in the network will improve the predictability of determining the likelihood of error when used for any storage controller in the network.

In a Fifteenth Embodiment, the subject matter of the Tenth through Fourteenth Embodiments may optionally include detecting a field error independent of the error checking operation, wherein the determining to train the machine learning module occurs in response to detecting the field error. The desired output value is set to an output value indicating to perform error checking to use to train the machine learning module in response to detecting the error.

With the Fifteenth Embodiment, the machine learning module predictability is improved by retraining the module to determine a likelihood of an error based on detecting a field error, such as a dropped write, that was detected independently of the running of the error checking. In this way, the machine learning module is trained during real time independent error detection to indicate an error to improve the likelihood of predicting an error during actual error operating conditions.

DETAILED DESCRIPTION

Prior art systems that periodically perform error checking operations in a storage array, such as a RAID array, direct resources and storage accesses away from applications for the purpose of performing error checking and handling. This redirection of computational and storage resources may result in latency delays to applications trying to access data in the storage array. Prior art systems that periodically perform error checking operations at fixed intervals may perform error checking more frequently than needed if there are relatively few errors in the storage array, thus needlessly causing latency delays. Further, periodically performing error checking operations at fixed intervals may perform error checking less frequently than needed if there are a greater number of errors occurring in the storage array, which may result in data integrity errors in the system.

Described embodiments provide improved computer technology for determining when to perform error checking and handling operations that use a machine learning module and algorithm to dynamically determine the likelihood of an error at a storage unit based on current operating parameters recorded for a storage device. The machine learning module may continually be retrained to improve the predictive accuracy of determining whether the storage device is experiencing errors using a current state of operational parameters and feedback on actual experienced errors or lack of errors. In this way, the described embodiments optimize the allocation of computational and storage resources to error checking operations by dynamically determining a frequency at which to perform error checking operations that are based on a prediction as to whether a data error is likely given current operating conditions at a storage device.

Figure 1:
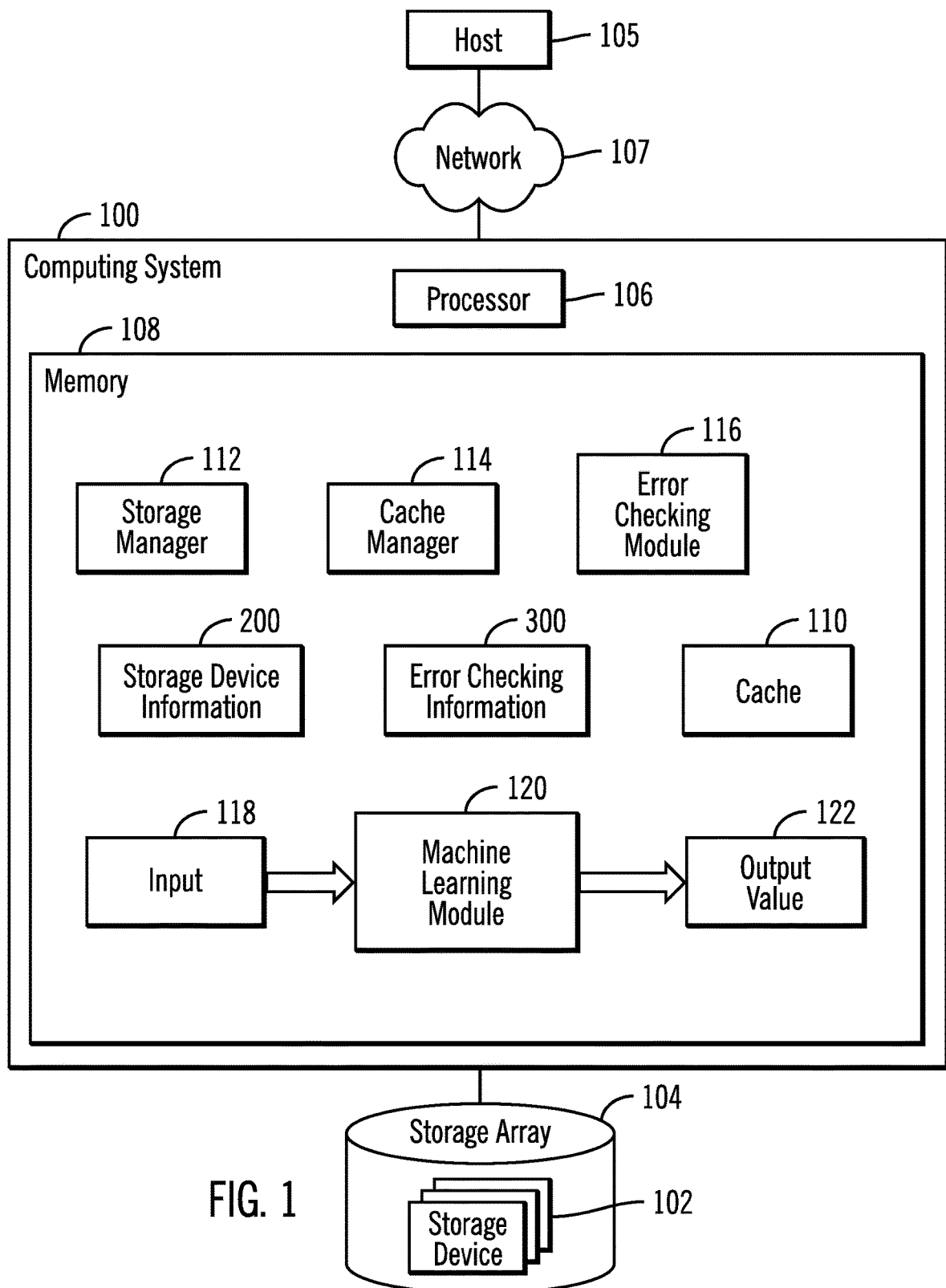
FIG. 1 illustrates an embodiment of a computing environment.

FIG. 1 illustrates an embodiment of a computing environment. A computing system 100 accesses data in storage devices 102 in a storage array 104. The computing system 100 includes a processor 106 and a memory 108, including a cache 110 to cache data for the storage array 104. The processor 106 may comprise one or more central processing units (CPUs) or a group of multiple cores on a single CPU. The cache 110 buffers data requested by processes within the computing system. Alternatively, the computing system 100 may comprise a storage controller that processes Input/Output (I/O) access requests for tracks in the storage array 104 from hosts 105 connecting to the computing system 100 (storage controller) over a network 107.

The memory 108 further includes a storage manager 112 to manage access requests from internal processes in the computing system 100 and/or from hosts 105 for tracks in the storage array 104. A cache manager 114 maintains accessed tracks in the cache 110 for future read access to the tracks to allow the accessed tracks to be returned from the faster access cache 110 instead of having to retrieve from the storage array 104. A track may comprise any unit of data configured in the storage array 104, such as a track, Logical Block Address (LBA), etc., which is part of a larger grouping of tracks, such as a volume, logical device, etc.

The memory 108 further includes an error checking module 116 to perform error checking operations, such as a parity check operation or parity scrub to determine data is valid according to parity or error checking codes (ECCs). If there are detected errors, the error checking module 116 may perform error correction operations, such as correcting the data using the parity information, correcting the parity information, fencing the data, or providing notification to replace a storage device. The error checking module 116 maintains storage device information 200 that has information on the storage devices 102 in the storage array 104 and error checking information 300 used to determine whether to perform an error checking operation and error handling. The error checking module 116 may provide storage device information 200 as input 118 to a machine learning module 120 to produce an output value 122 that indicates a likelihood that an error has occurred at the checked storage device 102 requiring an error checking operation to be performed to determine if there is an error at the storage device 102, such as a parity error.

The machine learning module 120 may implement a machine learning technique such as decision tree learning, association rule learning, neural network, inductive programming logic, support vector machines, Bayesian models, etc., to receive as input 118 certain of the storage device information 200 and generate an output value 122 or confidence level, such as a value between 0 and 1, indicating a likelihood that the there is an error at a storage unit, comprising one storage device or an array 104 of storage devices 102.

In one embodiment, the machine learning module 120 may comprise an artificial neural network programs trained using back propagation to adjust weights and biases at nodes in a hidden layer of the first artificial neural network program to produce an output value 122 based on input 118 comprising storage device information 200. Back propagation may comprise an algorithm for supervised learning of artificial neural networks using gradient descent. Given an artificial neural network and an error function, the method may calculate the gradient of the error function with respect to the neural network's weights and biases.

The storage manager 112, cache manager 114, the error checking module 116, and the machine learning module 120 are shown in FIG. 1 as program code loaded into the memory 108 and executed by the processor 106. Alternatively, some or all of the functions may be implemented in hardware devices in the system 100, such as in Application Specific Integrated Circuits (ASICs) or executed by separate dedicated processors.

The storage array 104 may comprise one or more storage devices 102 known in the art, such as a solid state storage device (SSD) comprised of solid state electronics, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices 102 may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The memory 108 may comprise a suitable volatile or non-volatile memory devices, including those described above.

The network 107 may comprise a Storage Area Network (SAN), a Local Area Network (LAN), a Wide Area Network (WAN), the Internet, and Intranet, etc.

In RAID embodiments, the error checking operation may comprise a parity scrub, where the error checking module 116 reads blocks within a RAID stripe of a RAID array configured within storage devices 102 and identifies errors using the parity data in parity blocks, such as dropped writes, media errors, check sum errors, parity consistency, etc.

In FIG. 1, the machine learning module 120 is shown separate from the error checking module 116. In further embodiments, some or all components of the machine learning module 120 may be part of the error checking module 116.

Figure 2:
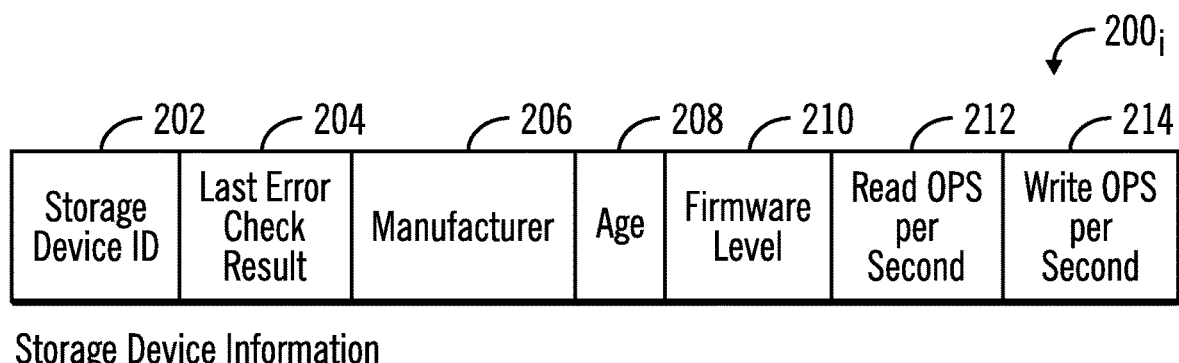
FIG. 2 illustrates an embodiment of storage device information.

FIG. 2 illustrates an embodiment of an instance of storage device information $200_i$ for a storage device $102_i$, and includes a storage device identifier (ID) 202 of a storage device $102_i$; a last error check result 204, such as the result of the last time the error checking module 116 performed an error checking operation, which may indicate no error, or a type of error, such as link error, hardware error, expander errors showing dropped links, dropped write, power error, etc.; a manufacturer 206 of the storage device 202; an age 208, which may be measured as a time since first used or measured by a number of writes that have occurred, e.g., wear; a firmware level 210 of the storage device 202; read operations ("OPS") per second 212 rate measured for a last number of writes (N) tracked at the storage device 202; and write operations per second 214 rate measured for the last number of writes (N) tracked at the storage device 202. The storage device information $200_i$ includes static information, such as 202, 206, 210, and dynamic information that may be continually updated, such as in blocks 204, 208, 212, and 214. For instance the last error check result 204 may be updated each time an error checking operation is performed at the storage device $102_i$ and the read 212 and write 214 operations per second and age 208 may be updated after one or more read/write operations.

Figure 3:
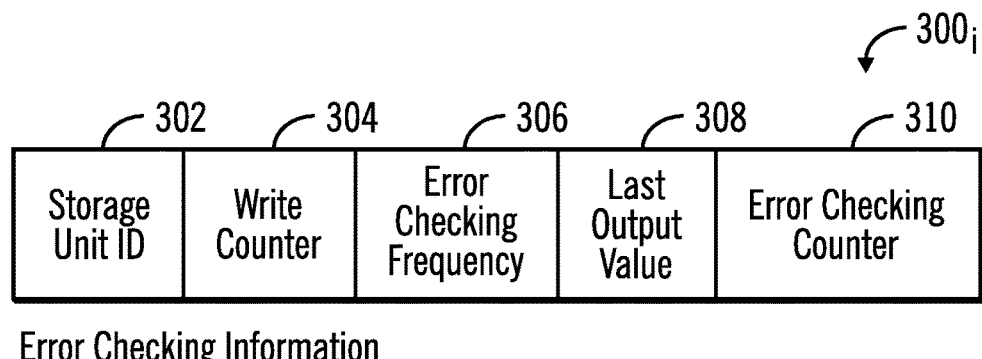
FIG. 3 illustrates an embodiment of error checking information.

FIG. 3 illustrates an instance of error checking information $300_i$ maintained for a storage unit, such as a RAID rank of storage devices 102 or one storage device $102_i$, that includes: a storage unit ID 302, e.g., RAID rank ID or a storage device ID $102_i$; a write counter 304 indicating a number of writes that have occurred since the last error checking operation with respect to the storage unit 302; an error check frequency 306 indicating a number of writes that must occur before an error checking operation at the storage unit 302 is to be performed; a last output value 308 calculated by the machine learning module 120 for the storage unit 302; and an error checking counter 310 indicating a number of error checking operations that have occurred at the storage unit 302 without detecting an error.

With the embodiment of FIG. 3, an instance of the error checking information $300_i$ may be maintained for each of the storage devices $102_i$, i.e., storage device specific error checking information, or maintained for all the storage devices in a storage unit, such as a RAID rank, where a write stripes data across multiple of the storage devices.

Figure 4:
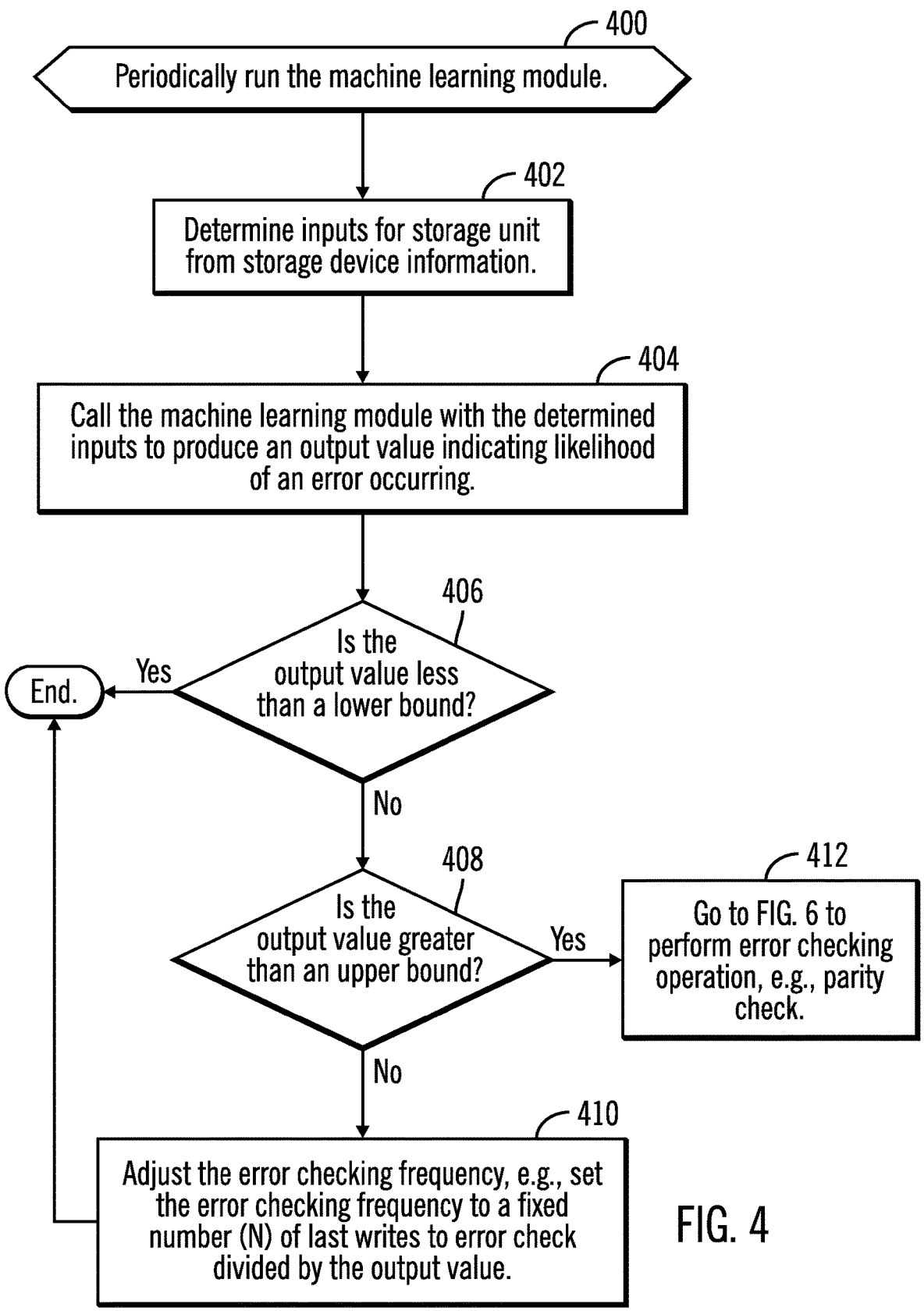
FIG. 4 illustrates an embodiment of operations to periodically run a machine learning module for error checking operations.

FIG. 4 illustrates an embodiment of operations performed by the error checking module 116 and/or machine learning module 120 to periodically run the machine learning module 120 to determine whether to perform an error checking operation or adjust the error checking frequency 306. The machine learning module 120 may be periodically run at time intervals or in response to events. The machine learning module 120 may be invoked separately for each of storage devices 102 or for a RAID rank to train for all the storage devices 102 in a RAID rank (or other type of storage array). Upon invoking (at block 400) the machine learning module 120 for a storage unit, which may comprise one storage device $102_i$ or a RAID rank or storage array of a plurality of storage devices 102, inputs 118 are determined (at block 402) from the storage device information $200_i$ for one or more storage devices $102_i$ comprising the storage unit. In an embodiment where the error checking information $300_i$ is provided for an individual storage device $102_i$, then the machine learning module 120 may receive as input 118 the storage device information $200_i$ for just one storage device $102_i$. In an embodiment where the error checking information $300_i$ is provided for a RAID rank of storage devices, then the machine learning module 120 may receive as input 118 the storage device information $200_i$ for all of the storage devices 102 in the RAID rank.

The machine learning module 120 is called (at block 404) with the determined inputs 118 to produce an output value 122 indicating a likelihood of an error occurring at the storage unit (i.e., storage device or storage/RAID array). In one embodiment, the output value 122 may be between 0 and 1, with a value closer to 0 indicating a lower likelihood of an error occurring at the storage unit and a value closer to 1 indicating a higher likelihood of an error occurring at the storage unit.

If (at block 406) the output value is less than a lower bound, which may indicate a low likelihood of a data error, then control ends. If (from the no branch of block 406) the output value is higher than the lower bound but less (from the no branch of block 408) than an upper bound, then the error checking frequency 306 for the storage unit may be adjusted (at block 410) based on the output value. In one embodiment, the error checking frequency 306 may be adjusted by setting the error checking frequency 306 to a fixed number (N) of last writes to error check divided by the output value. In alternative embodiments, other calculations and variables may be considered with the output value to adjust the error checking frequency 306. If (at block 408) the output value is greater than an upper bound, indicating a greater likelihood of an error at the storage unit, then control proceeds (at block 412) to FIG. 6 to perform an error checking operation, e.g., parity check, with respect to the last N writes at the storage unit, e.g., one storage device or a rank of storage devices 102.

With the embodiment of FIG. 4, the machine learning module 120 is run to determine a likelihood that there is an error in a storage unit based on actual operating conditions of the one or more storage devices in the storage unit. This likelihood is based on a trained machine learning algorithm that bases the determination of the likelihood of an error on current operating conditions at the storage devices 102 and statistical and probabilistic models that relate such operating conditions of the storage devices 102 to a likelihood of an error. In this way, a determination of an error checking frequency is adjusted based on the likelihood of an error so that the error checking frequency 306 is increased, i.e., the frequency of number of writes is decreased, if there is a greater likelihood of an error and the error checking frequency 306 is reduced, i.e., the frequency of the number of writes is increased, if there is less of a likelihood of an error at the storage unit. Because the error checking operations, such as a parity scrub for RAID array storage units, consume substantial processing resources, which may cause latency in other operations, adjusting the error checking frequency based on actual error conditions error improves the allocation of system resources. If there is a low likelihood of an error, then the error checking frequency may be reduced to reduce the number of error checking operations, thus freeing resources to reduce latency for other operations. However, if there is a higher likelihood of an error, then the error checking frequency may be increased because the importance of the benefits of correcting data errors offsets the negative impact of increased latency for other operations. In this way, the use of the machine learning module 120 to adjust the error checking frequency optimizes the allocation of resources between error checking and other operations.

Figure 5:
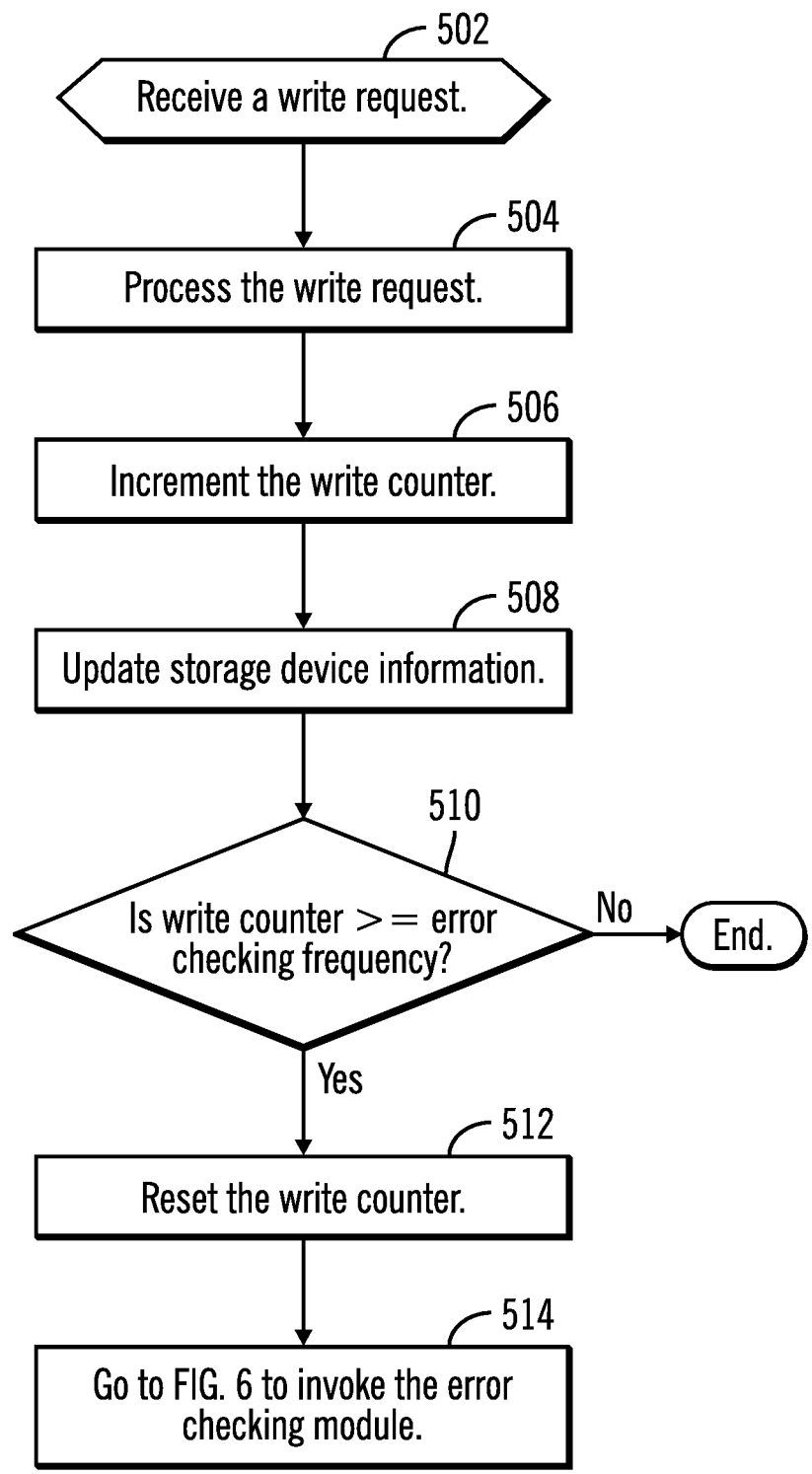
FIG. 5 illustrates an embodiment of operations to process a write request.

FIG. 5 illustrates an embodiment of operation performed by the storage manager 112 to process a write request to a storage unit (storage device or RAID rank of storage devices). Upon receiving (at block 502) a write request, the write request is processed (at block 504) such as written to a storage device $102_i$ or striped across a rank of storage devices 102. The write counter 304 for the storage unit is incremented (at block 506) and the storage device information $200_i$ for the one or more storage devices in the storage unit is updated (at block 508), such as in fields 208, 212, 214. If (at block 510) the write counter 304 is greater than or equal to the error checking frequency 306, then the write counter 304 is reset (at block 512) and control proceeds (at block 514) to FIG. 6 to perform an error checking operation, e.g., parity check, with respect to the last N writes at the storage unit, e.g., one storage device or a rank of storage devices 102. If (at block 510) the write counter is less than the error checking frequency 306, then control ends.

In FIG. 5, the determination of whether to error check is based on whether the write counter 304 is greater than or less than the error checking frequency 306. In alternative embodiments, other conditions or relationships between the write counter 304 and error checking frequency 306 may be used to determine whether to error check or not.

With the embodiment of FIG. 5, error checking operations are optimized by checking for errors when the write counter exceeds the error checking frequency 306, which is adjusted based on a determination of a likelihood of an error occurring with respect to the storage device.

Figure 6:
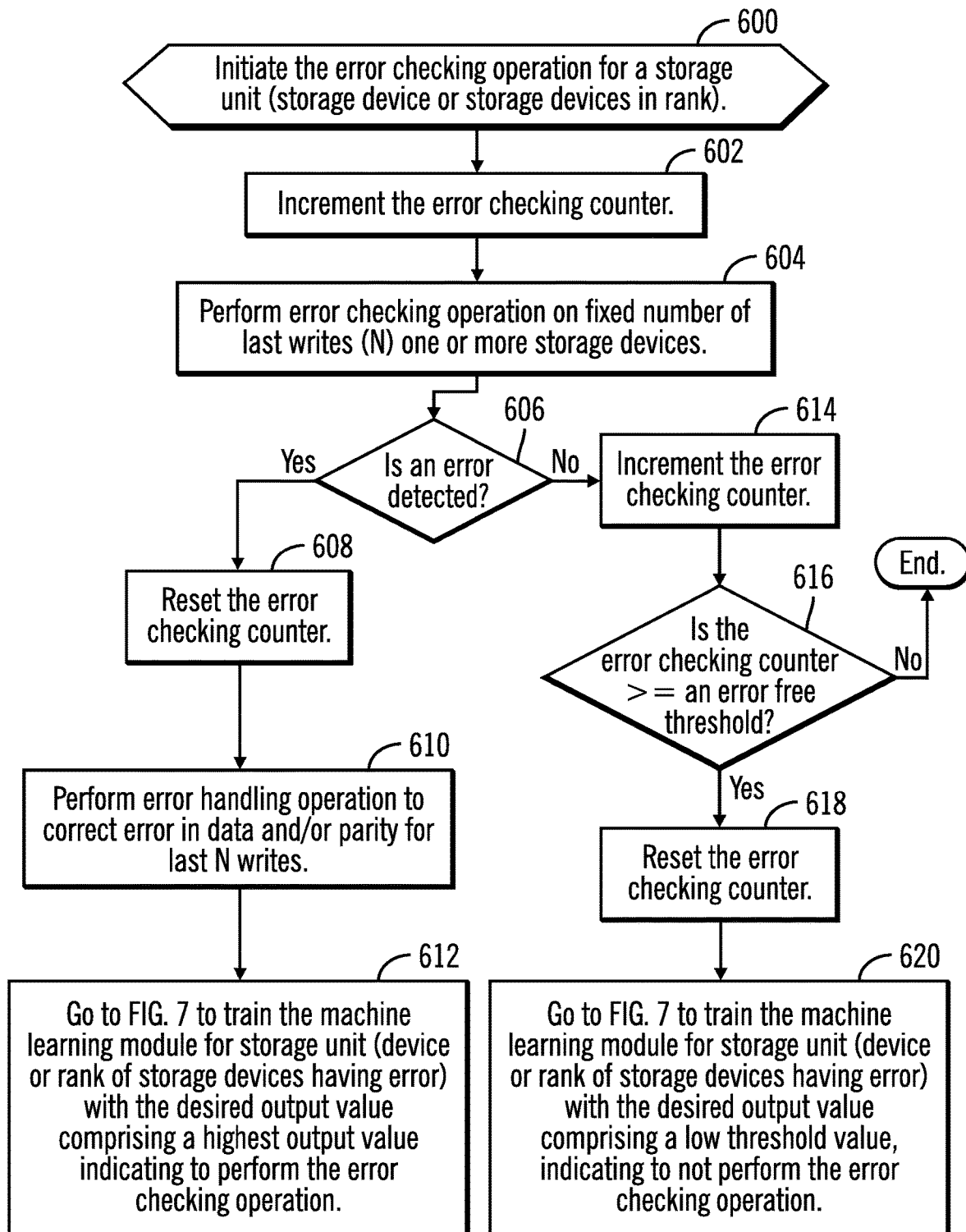
FIG. 6 illustrates an embodiment of operations to perform an error checking operation.

FIG. 6 illustrates an embodiment of error checking operations performed by the error checking module 116 that may be invoked at block 412 in FIG. 4 when the machine learning module 120 produces a high output value 122 and at block 514 in FIG. 5 if the write counter 304 exceeds the error checking frequency 306. Upon initiating (at block 600) error checking operations, the error checking counter 310 is incremented (at block 602) and an error checking operations is performed (at block 604) on the fixed number of last writes (N) on the storage unit (one or more storage devices 102). The error checking operation may comprise a parity checking or error correction code checking operation. If (at block 606) an error is detected, then the error checking counter 310, indicating a number of consecutive error checking operations with no error, is reset (at block 608). The error checking module 116 performs (at block 610) an error handling operation to correct error in data and/or the parity information for the last N writes checked. The error handling may correct data in the last N writes from the parity information or correct the parity information from the data. After performing error handling, control proceeds (at block 612) to FIG. 7 to train the machine learning module 120 for the storage unit (device or rank of storage devices having error) with a desired output value comprising a highest output value indicating to perform the error checking operation, e.g., a desired output value of one.

If (at block 606) an error is not detected, then the error checking counter 310, indicating a number of consecutive error checking operations with no error, is incremented (at block 614). A determination is made (at block 616) whether the error checking counter 310 is greater than or equal to an error free threshold number of error checking operations. If (at block 616) the error checking counter exceeds the error free threshold, i.e. there has been a threshold number of error checking operations with no errors, then the error checking counter 318 is reset (at block 618) and control proceeds (at block 620) to FIG. 7 to train the machine learning module 120 for storage unit (device or rank of storage devices having error) with the desired output value comprising a low threshold value, indicating to not perform the error checking operation, such as 0.001. If (at block 616) the error checking counter 310 does not exceed the error free threshold, then control ends without retraining the machine learning module 120 to decrease the output value, because there have not been a sufficient number of error free error checking operations to warrant adjusting the output value downward.

With the embodiment of FIG. 6, after performing error checking, the machine learning module 120 is trained to produce an output value indicating a high likelihood of error from the current operating conditions at the storage unit that resulted in the error to increase the likelihood that the machine learning module 120 can accurately predict an error when similar operating conditions arise in the future. Likewise, if an error has not occurred after a predefined number of error checking operations, then the machine learning module 120 is trained to produce an output value indicating a low likelihood of error from the current operating conditions at the storage unit that resulted in no error occurring for several error checking operations to increase the likelihood that the machine learning module 120 can accurately predict no error when similar operating conditions occur in the future.

Figure 7:
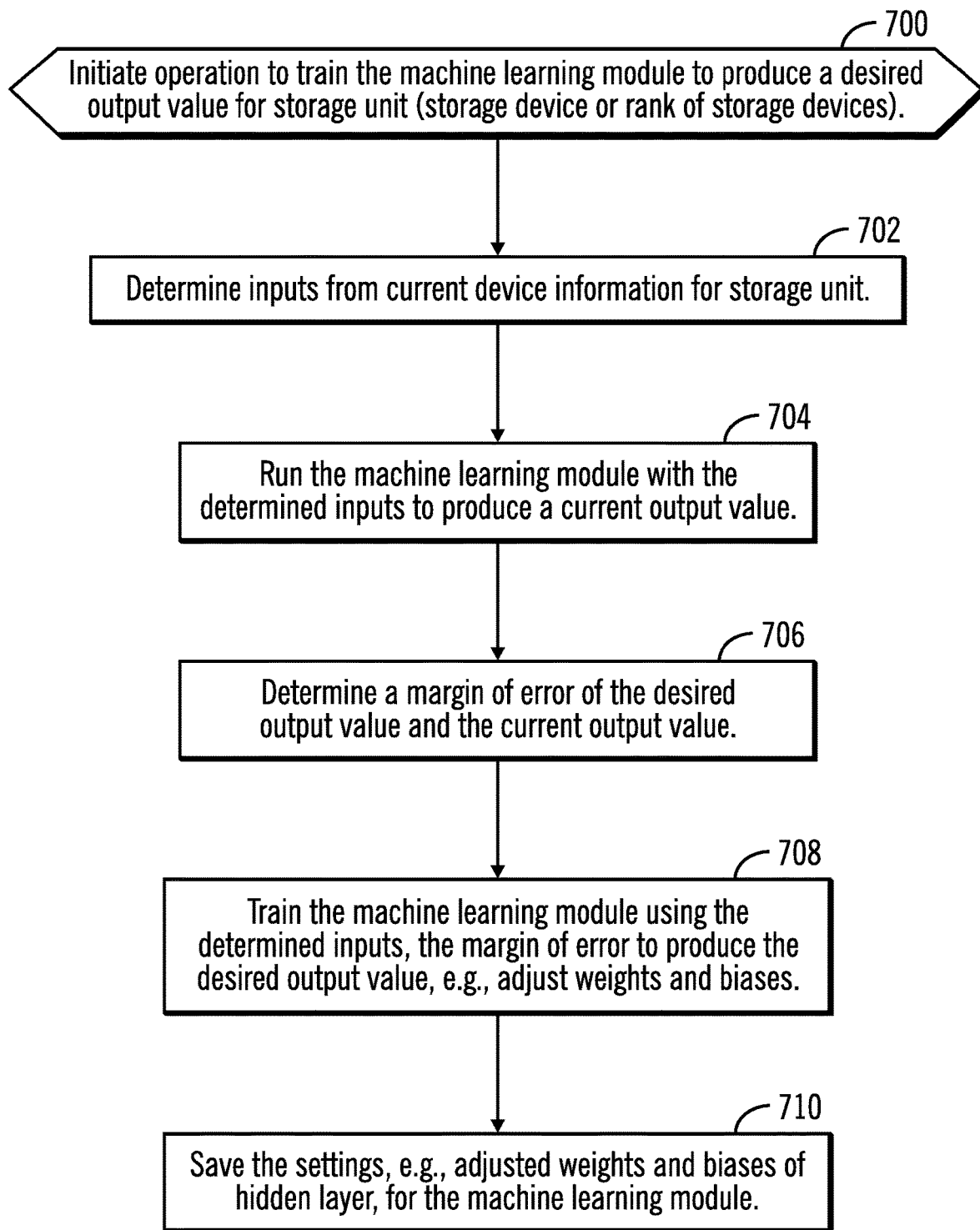
FIG. 7 illustrates an embodiment of operations to train the machine learning module to determine a likelihood of an error in a storage unit.

FIG. 7 illustrates an embodiment of operations performed by the error checking module 116 and/or machine learning module 120 to retrain the machine learning module 120 to produce a desired output value, such as a higher or lower output value depending on whether an error has been detected (block 610 in FIG. 6) or not detected a threshold number of times (from block 620 in FIG. 6). Upon initiating (at block 700) an operation to train the machine learning module 120 to produce a desired output value for storage unit (storage device or rank of storage devices), a determination is made (at block 702) of the inputs from the current storage device information $200_i$ for the one or more storage devices in the storage unit for which the machine learning module 120 is being trained. The machine learning module 120 is run (at block 704) with the determined inputs to produce a current output value 122. A determination is made (at block 706) of a margin of error of the desired output value and the current output value 122. The machine learning module 120 is trained (at block 708) using the determined inputs 118 and the margin of error, and other information, to produce the desired output value. The machine learning module 120 may be trained using back propagation to reduce the margin of error, to produce the desired output value. In embodiments where the machine learning module 120 algorithm comprises an artificial neural network, a backward propagation routine may be used to retrain the machine learning module 120 to produce the desired output value 122. For other types of machine learning algorithms, such as Bayesian models, other techniques may be used to retrain the machine learning module 120 to produce the desired output value. The settings, e.g., adjusted weights and biases of the hidden layer of the machine learning module 120, are then saved (at block 710) for later us.

With the embodiment of FIG. 7, the machine learning module 120 is retrained to produce a desired output value that reflects the current likelihood of an error based on current attributes of the storage device(s) to have the machine learning module 120 more accurately predict a likelihood of an error at the storage unit, e.g., single storage device or array of storage devices.

In the embodiments of FIGS. 1-7, the machine learning module 120 determines a likelihood of error at one or more storage devices for a single computer system and storage array 104 having one or more RAIDs ranks.\

Figure 8:
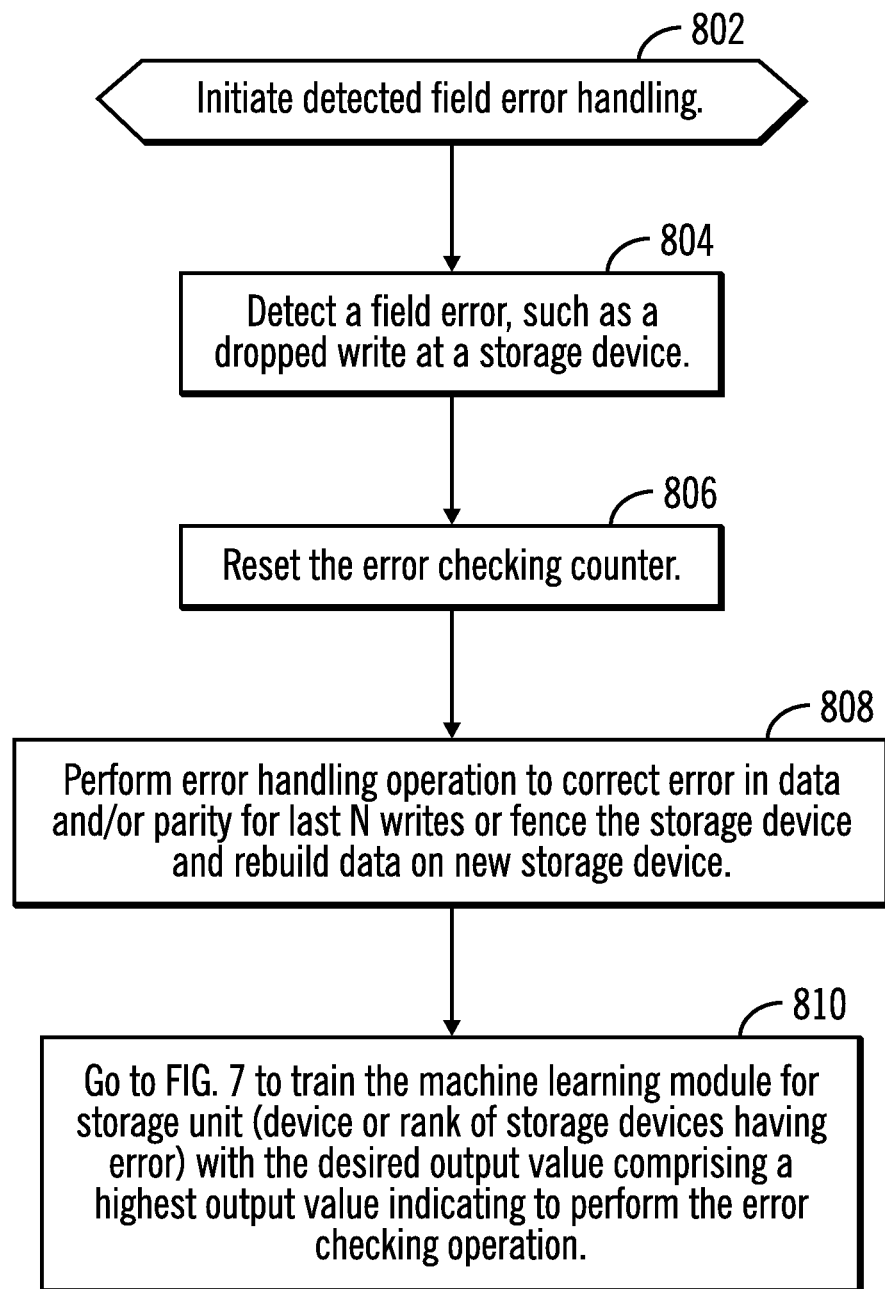
FIG. 8 illustrates an embodiment of operations to perform field error handling.

FIG. 8 illustrates an embodiment of operations performed by the error checking module 116 and/or machine learning module 120 to handle detected field error, such as a dropped error or other error independently encountered. Upon initiating (at block 802) field error handling a field error, such as a dropped write, is detected (at block 806) the error checking counter 310 is reset (at block 806). Error handling operations are performed (at block 808) to correct an error in data and/or parity for the last N writes, or fence the storage device 102 having the error and rebuild data no a new storage device. Control then proceeds (at block 810) to FIG. 7 to train the machine learning module 120 for the storage unit (device or rank of storage devices having the error) with the desired output value comprising a highest output value indicating to perform the error checking operation, due to the detection of the field error.

With the embodiment of FIG. 8, the machine learning module is trained upon detecting a field error outside of the error checking operation of FIG. 6 so as to retrain the machine learning module 120 to output a value indicating to perform error checking if the inputs 118 at the time of the detected field error occur.

Figure 9:
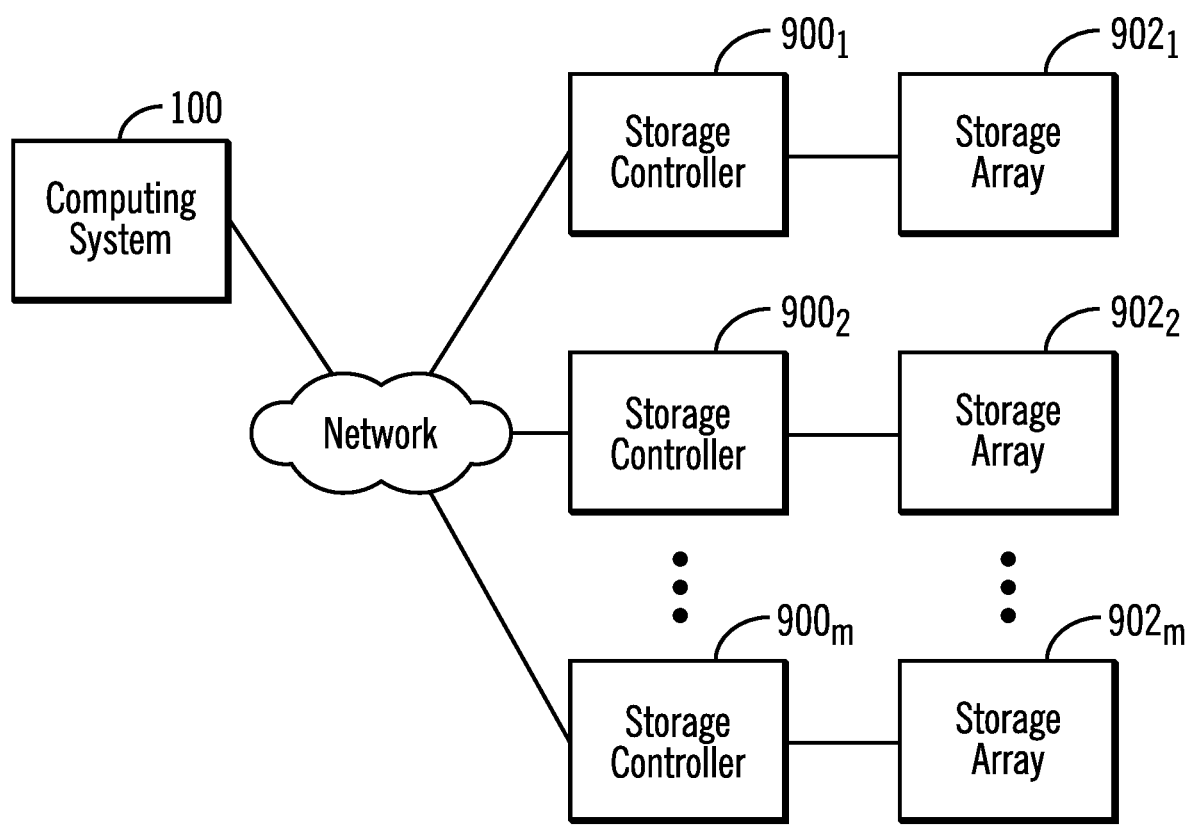
FIG. 9 illustrates an additional embodiment of a computing environment including a plurality of storage controllers and storage arrays.

FIG. 9 illustrates an additional embodiment where the computing system 100 described with respect to FIGS. 1-8 is in communication with a plurality of storage controllers $900_1$, $900_2$ ... $900_m$ each managing access to a storage array $902_1$, $902_2$ ... $902_m$ over a network 904. The machine learning module 120 receives inputs from one or more storage devices in a storage array $902_1$, $902_2$ ... $902_m$ to calculate an output value for the storage controller $900_1$, $900_2$ ... $900_m$ managing the storage array $902_1$, $902_2$ ... $902_m$ to use to determine whether to initiate an error checking and correction operation. In this way, the machine learning module 120 may be more frequently and hence more accurate because it is trained from storage devices in multiple storage arrays $902_1$, $902_2$ ... $902_m$. Although the machine learning module 120, storage device information 200 and error checking information 300 may be maintained in the computing system 100, the error checking module 116 may be maintained locally in each of the storage controllers $900_1$, $900_2$ ... $900_m$.

In the described embodiment, variables "i, m, n", etc., when used with different elements may denote a same or different instance of that element.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
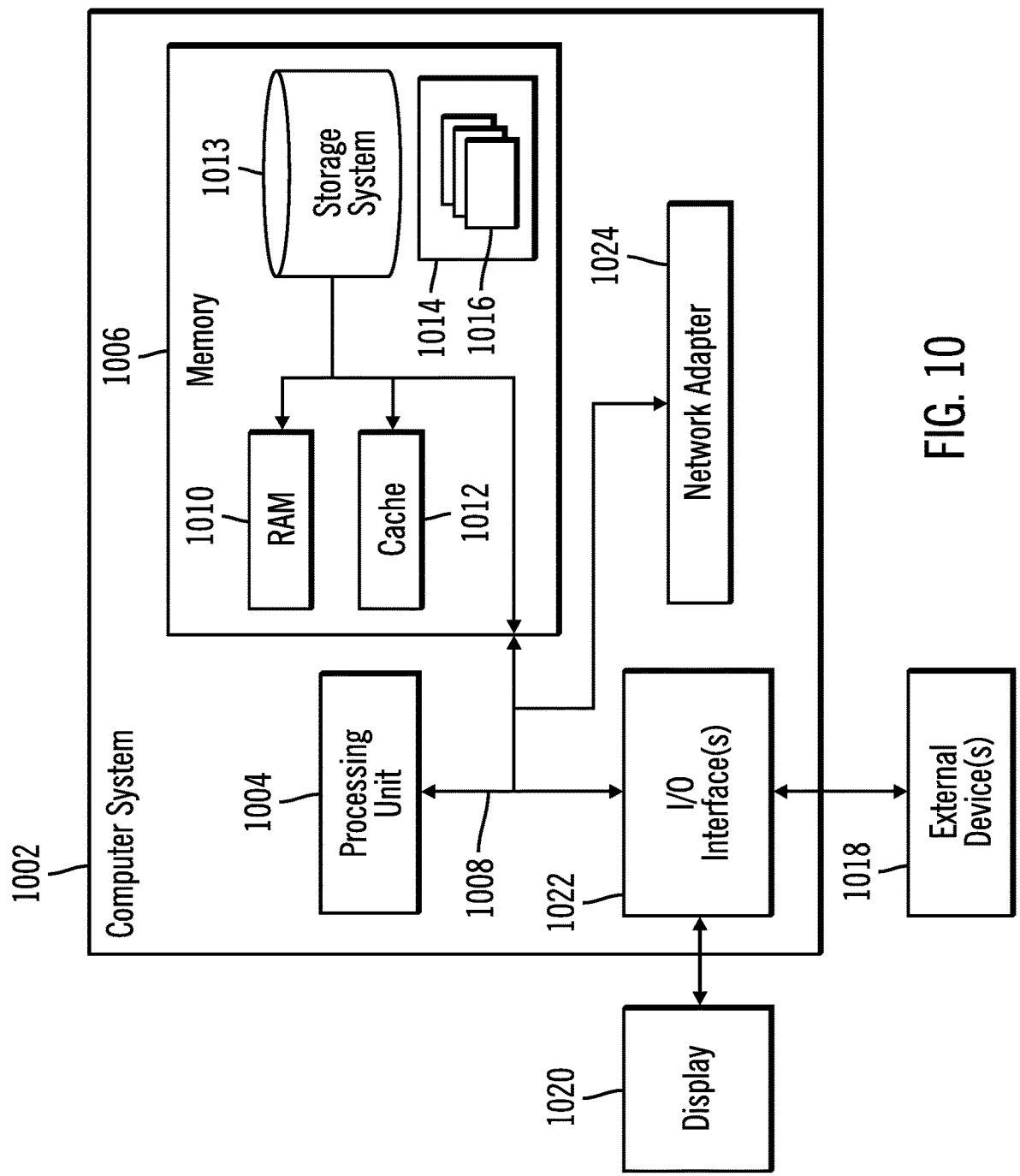
FIG. 10 illustrates a computing environment in which the components of FIGS. 1 and 8 may be implemented.

The computational components of FIGS. 1 and 8, including the hosts 105, computing system 100, and storage controllers $900_1, 900_2 \ldots 900_m$ may be implemented in one or more computer systems, such as the computer system 1002 shown in FIG. 10. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer 1002 may be implemented as program modules 1016 which generally carry out the functions and/or methodologies of embodiments of the invention as described herein. The systems of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for error checking data in a storage unit, the computer program product comprising a computer readable storage medium storing computer readable program code that when executed performs operations, the operations comprising:

in response to detecting an error at the storage unit, performing:

determining inputs comprising attributes of at least one storage device of the storage unit; and training a machine learning module, by training weights and biases of nodes in the machine learning module, to process the determined inputs to produce an output value comprising a numerical value indicating a likelihood that there is an error in the storage unit, wherein an error checking operation of the storage unit is performed when the numerical value indicates the likelihood that there is the error; and executing the machine learning module to produce a further output value comprising a numerical value indicating a likelihood that there is an error in the storage unit and used to determine whether to perform an error checking operation with respect to the storage unit.

2. The computer program product of claim 1, wherein the operations further comprise:
   detecting that an error has not been detected within a fixed number of error checking operations, wherein the determining inputs and training the machine learning module are performed in response to detecting that the error has not been detected within the fixed number of error checking operations.

3. The computer program product of claim 1, wherein the training the machine learning module comprises:
   executing the machine learning module to produce a current output value;
   determining a margin of error of the current output value and the numerical value indicating the likelihood that there is the error in the storage unit; and
   using the margin of error and the inputs to train the weights and the biases of the nodes in the machine learning module to produce the numerical value.

4. The computer program product of claim 1, wherein the machine learning module produces output values from inputs of storage arrays of storage devices managed by storage controllers, wherein the output values from the machine learning module are provided to the storage controllers, wherein the storage controllers perform error checking operations with respect to the storage devices in the storage arrays managed by the storage controllers when the output values indicate the likelihood that there is the error.

5. The computer program product of claim 1, wherein the operations further comprise:
   detecting a field error independent of the error checking operation, wherein the determining inputs and training the machine learning module are performed in response to detecting the field error.

6. The computer program product of claim 1, wherein the numerical value is from zero to 1 indicating a likelihood that there is an error in the storage unit, wherein the output value indicates to:
   not perform the error checking operation in response to the output value being less than a lower bound;
   perform the error checking operation in response to the output value being greater than an upper bound; and
   adjust an error check frequency based on the output value in response to the output value being between the lower bound and the upper bound.

7. The computer program product of claim 1, wherein the attributes of the at least one storage device used as input to the machine learning module include at least one of:
   an error type if the error checking operation detected an error during a last run of the error checking operation or indication of no error if the error checking operation did not detect an error during the last run;
   a type of at least one storage device comprising the storage unit;
   an age of the at least one storage device from first use;
   a firmware level of the at least one storage device;
   a read operations per second at the at least one storage device; and
   a write operations per second at the at least one storage device.

8. A system for error checking data in a storage unit, comprising:
   a processor; and
   a computer readable storage medium storing computer readable program code that when executed performs operations, the operations comprising:
      in response to detecting an error at the storage unit, performing:
         determining inputs comprising attributes of at least one storage device of the storage unit; and
         training a machine learning module, by training weights and biases of nodes in the machine learning module, to process the determined inputs to produce an output value comprising a numerical value indicating a likelihood that there is an error in the storage unit, wherein an error checking operation of the storage unit is performed when the numerical value indicates the likelihood that there is the error; and
      executing the machine learning module to produce a further output value comprising a numerical value indicating a likelihood that there is an error in the storage unit and used to determine whether to perform an error checking operation with respect to the storage unit.

9. The system of claim 8, wherein the operations further comprise:
   detecting that an error has not been detected within a fixed number of error checking operations, wherein the determining inputs and training the machine learning module are performed in response to detecting that the error has not been detected within the fixed number of error checking operations.

10. The system of claim 8, wherein the training the machine learning module comprises:
    executing the machine learning module to produce a current output value;
    determining a margin of error of the current output value and the numerical value indicating the likelihood that there is the error in the storage unit; and
    using the margin of error and the inputs to train the weights and the biases of the nodes in the machine learning module to produce the numerical value.

11. The system of claim 8, wherein the machine learning module produces output values from inputs of storage arrays of storage devices managed by storage controllers, wherein the output values from the machine learning module are provided to the storage controllers, wherein the storage controllers perform error checking operations with respect to the storage devices in the storage arrays managed by the storage controllers when the output values indicate the likelihood that there is the error.

12. The system of claim 8, wherein the operations further comprise:
    detecting a field error independent of the error checking operation, wherein the determining inputs and training the machine learning module are performed in response to detecting the field error.

13. The system of claim 8, wherein the numerical value is from zero to 1 indicating a likelihood that there is an error in the storage unit, wherein the output value indicates to:
    not perform the error checking operation in response to the output value being less than a lower bound;
    perform the error checking operation in response to the output value being greater than an upper bound; and adjust an error check frequency based on the output value in response to the output value being between the lower bound and the upper bound.

14. The system of claim 8, wherein the attributes of the at least one storage device used as input to the machine learning module include at least one of:
   an error type if the error checking operation detected an error during a last run of the error checking operation or indication of no error if the error checking operation did not detect an error during the last run;
   a type of at least one storage device comprising the storage unit;
   an age of the at least one storage device from first use;
   a firmware level of the at least one storage device;
   a read operations per second at the at least one storage device; and
   a write operations per second at the at least one storage device.

15. A method for error checking data in a storage unit, comprising:
   in response to detecting an error at the storage unit, performing:
      determining inputs comprising attributes of at least one storage device of the storage unit; and
      training a machine learning module, by training weights and biases of nodes in the machine learning module, to process the determined inputs to produce an output value comprising a numerical value indicating a likelihood that there is an error in the storage unit, wherein an error checking operation of the storage unit is performed when the numerical value indicates the likelihood that there is the error; and
      executing the machine learning module to produce a further output value comprising a numerical value indicating a likelihood that there is an error in the storage unit and used to determine whether to perform an error checking operation with respect to the storage unit.

16. The method of claim 15, further comprising:
   detecting that an error has not been detected within a fixed number of error checking operations, wherein the determining inputs and training the machine learning module are performed in response to detecting that the error has not been detected within the fixed number of error checking operations.

17. The method of claim 15, wherein the training the machine learning module comprises:
   executing the machine learning module to produce a current output value;
   determining a margin of error of the current output value and the numerical value indicating the likelihood that there is the error in the storage unit; and
   using the margin of error and the inputs to train the weights and the biases of the nodes in the machine learning module to produce the numerical value.

18. The method of claim 15, wherein the machine learning module produces output values from inputs of storage arrays of storage devices managed by storage controllers, wherein the output values from the machine learning module are provided to the storage controllers, wherein the storage controllers perform error checking operations with respect to the storage devices in the storage arrays managed by the storage controllers when the output values indicate the likelihood that there is the error.

19. The method of claim 15, further comprising:
   detecting a field error independent of the error checking operation, wherein the determining inputs and training the machine learning module are performed in response to detecting the field error.

20. The method of claim 15, wherein the numerical value is from zero to 1 indicating a likelihood that there is an error in the storage unit, wherein the output value indicates to:
   not perform the error checking operation in response to the output value being less than a lower bound;
   perform the error checking operation in response to the output value being greater than an upper bound; and
   adjust an error check frequency based on the output value in response to the output value being between the lower bound and the upper bound.

21. The method of claim 15, wherein the attributes of the at least one storage device used as input to the machine learning module include at least one of:
   an error type if the error checking operation detected an error during a last run of the error checking operation or indication of no error if the error checking operation did not detect an error during the last run;
   a type of at least one storage device comprising the storage unit;
   an age of the at least one storage device from first use;
   a firmware level of the at least one storage device;
   a read operations per second at the at least one storage device; and
   a write operations per second at the at least one storage device.

* * * * *